(12) United States Patent
Kamiyama et al.

(10) Patent No.: US 8,988,460 B2
(45) Date of Patent: Mar. 24, 2015

(54) DISPLAYING NODES VISUALLY OFFSET FROM ASSOCIATED COMPONENTS

(75) Inventors: Yoshiroh Kamiyama, Tokyo (JP); Kotaro Shima, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 13/141,818

(22) PCT Filed: Apr. 22, 2010

(86) PCT No.: PCT/JP2010/057113
§ 371 (c)(1),
(2), (4) Date: Jun. 23, 2011

(87) PCT Pub. No.: WO2010/123048
PCT Pub. Date: Oct. 28, 2010

(65) Prior Publication Data
US 2012/0146996 A1      Jun. 14, 2012

(30) Foreign Application Priority Data
Apr. 24, 2009    (JP) ................................ 2009-107108

(51) Int. Cl.
*G06T 19/20*    (2011.01)
*G06T 11/60*    (2006.01)
*G06F 3/0481*   (2013.01)
*G06F 9/44*     (2006.01)

(52) U.S. Cl.
CPC ................ *G06F 3/0481* (2013.01); *G06F 8/34* (2013.01); *G06T 11/60* (2013.01)
USPC .......................................... 345/629; 345/419

(58) Field of Classification Search
None
See application file for complete search history.

(56) References Cited

U.S. PATENT DOCUMENTS

| | | | | |
|---|---|---|---|---|
| 5,555,354 | A | * | 9/1996 | Strasnick et al. ............. 345/427 |
| 5,758,122 | A | * | 5/1998 | Corda et al. .................. 717/125 |
| 7,278,130 | B2 | | 10/2007 | Iborra et al. |
| 7,467,125 | B2 | | 12/2008 | Khatchatrian et al. |
| 7,904,415 | B2 | | 3/2011 | Khatchatrian et al. |
| 7,958,454 | B2 | | 6/2011 | Gaudette |

(Continued)

FOREIGN PATENT DOCUMENTS

| | | |
|---|---|---|
| CN | 1506879 A | 6/2004 |
| CN | 102301329 A | 12/2011 |

(Continued)

OTHER PUBLICATIONS

Hirst, T., "Rewiring the Web With Yahoo Pipes 'It's all about me' edition," [online] SlideShare Inc. © 2013, <http://www.slideshre.net/psychemedia/pipes-book-imaginings>, 32 pgs.

(Continued)

*Primary Examiner* — David Zarka
*Assistant Examiner* — Jason Pringle-Parker
(74) *Attorney, Agent, or Firm* — Cuenot, Forsythe & Kim, LLC

(57) ABSTRACT

A display apparatus configured to move a drag object on a screen in accordance with an operation of a pointer. The display apparatus can include a detection unit configured to detect a target object on the screen, the target object being a destination of the drag object, and a display control unit configured to display the drag object in a position closer to the target object than a display position of the pointer moved in accordance with an operation performed by a user.

18 Claims, 12 Drawing Sheets

(56) References Cited

U.S. PATENT DOCUMENTS

| | | | |
|---|---|---|---|
| 8,201,102 | B2 | 6/2012 | Lee et al. |
| 8,451,232 | B2 | 5/2013 | Tolmasky et al. |
| 2003/0058241 | A1 | 3/2003 | Hsu |
| 2004/0117379 | A1 | 6/2004 | Khatchatrian et al. |
| 2004/0215657 | A1 | 10/2004 | Drucker et al. |
| 2005/0134606 | A1 | 6/2005 | Hong et al. |
| 2005/0183041 | A1* | 8/2005 | Chiu et al. ............. 715/850 |
| 2006/0010394 | A1 | 1/2006 | Chaudhri et al. |
| 2006/0015818 | A1 | 1/2006 | Chaudhri et al. |
| 2007/0101291 | A1 | 5/2007 | Forstall et al. |
| 2008/0165143 | A1 | 7/2008 | Tolmasky et al. |
| 2008/0298342 | A1 | 12/2008 | Appleton et al. |
| 2008/0313648 | A1 | 12/2008 | Wang et al. |
| 2009/0024658 | A1 | 1/2009 | Khatchatrian et al. |
| 2009/0060178 | A1 | 3/2009 | Montgomery et al. |
| 2009/0204594 | A1 | 8/2009 | Akkiraju et al. |
| 2010/0333017 | A1* | 12/2010 | Ortiz ............. 715/800 |
| 2012/0293510 | A1 | 11/2012 | Kamiyama et al. |
| 2013/0262993 | A1 | 10/2013 | Tolmasky et al. |

FOREIGN PATENT DOCUMENTS

| | | |
|---|---|---|
| EP | 0483777 A2 | 6/1992 |
| EP | 2423809 A4 | 4/2012 |
| JP | 2000-099237 A | 4/2000 |
| JP | 2007115248 A | 5/2007 |
| JP | 5379847 B2 | 12/2013 |
| TW | 200516433 B | 5/2005 |
| TW | 200844837 A | 11/2008 |
| TW | 201106251 A | 2/2011 |
| WO | 2010123048 A1 | 10/2010 |

OTHER PUBLICATIONS

Haeberli, P.E., "Conman: A Visual Programming language for Interactive Graphics," [online] ACM SIGGRAPH Computer Graphics, vol. 22, No. 4, ACM Aug. 1988, pp. 103-111 [retrieved May 26, 2011] retrieved from the Internet: <http://people.cs.vt.edu/~north/infoviz/conman.pdf>.

Makoto, J.O., "IBM Mashup Center—Lotus Mashups Technical Overview," [online] IBM Corporation, Mar. 28, 2009 [retrieved May 26, 2011 and translated using GOOGLE Toolbar] retrieved from the Internet: <http://www.ibm.com/developerworks/jp/ysl/library/lotus/y-lot-mashups1/>.

European Extended Search Report, EPO Application No. 10767105.9, Mar. 8, 2012, 8 pages.

Lamonica, M. "IBM touts Web 2.0 cred with Lotus Mashups" [Online] CNET News Blogs, CBS Interactive Inc., Jan. 23, 2008, retrieved from the Internet: <news.cnet.com18301-10784_3-9856060-7.html>, 2 pgs.

Feronato, E., "Create a Lightbox Effect only with CSS—no javascript needed" [Online] Emanuele Feronato Italian Geek and PROgrammer Blog, Aug. 22, 2007, retrieved from the Internet: <http://www.emanueleferonato.com/2007/08/22/create-a-lightbox-effect-only-with-css-no-javascript-needed/>, 3 pgs.

"IBM trials and demos/lotusphere 2008 Comes to You—Lotus Mashups" [online] IBM Corporation, Mar. 24, 2008, 3 pgs.

"Beyond the One Way Web: From Publishing to Participation", [online] Blog at WordPress.com, retrieved from the Internet: <http://beyondtheonewayweb.wordpress.com/2008/04/04/>, 17 pgs.

WIPO PCT Appln. No. 2010123048A, International Search Report, Jul. 12, 2010, 2 pg.

WIPO PCT Appln. No. 2010123048A, International Preliminary Examination Report on Patentability, Nov. 11, 2011, 8 pg.

U.S. Appl. No. 13/565,325, Non-Final Office Action, Dec. 19, 2012, 15 pg.

U.S. Appl. No. 13/565,325, Final Office Action, Apr. 24, 2013, 22 pg.

U.S. Appl. No. 13/565,325, Advisory Action, Jul. 2, 2013, 4 pg.

U.S. Appl. No. 13/565,325, Examiner's Answer to Appeal Brief, Novl.18, 2013, 34 pg.

* cited by examiner

DISPLAYING NODES VISUALLY OFFSET FROM ASSOCIATED COMPONENTS

CROSS-REFERENCE TO RELATED APPLICATIONS

This application is the national stage of PCT/JP2010/057113, filed 22 Apr. 2010, designating, inter alia, the United States and claiming priority to Japanese Patent Application No. 2009-107108, filed 24 Apr. 2009, each of which is hereby incorporated by reference.

BACKGROUND

The embodiments of the present invention relate to an editing apparatus that edits a display screen to display a plurality of components thereon, and an editing method and computer program product.

In the field of the Internet, a technique called mashup is known, enabling a plurality of services and data, for example, provided from a server to be displayed on one display screen. A software program to create a display screen for mashups also is provided.

BRIEF SUMMARY

An embodiment can include an editing apparatus. The editing apparatus can include a memory storing a program and a central processing unit coupled to the memory. Responsive to executing the program, the central processing unit can be configured to implement various units. The units can include a component output unit for outputting a display screen on which a plurality of components are displayed and a node output unit for outputting a plurality of nodes respectively corresponding to the plurality of components on the display screen so that the nodes are displayed along with the plurality of components so as to overlap the display of the plurality of components. The units further can include a setting unit for setting, in response to a user's instruction of association between two or more of the nodes, an association between two or more of the components corresponding to the two or more of the nodes.

Another embodiment can include an editing method. The editing method can include outputting, using a central processing unit, a display screen on which a plurality of components are displayed, outputting a plurality of nodes respectively corresponding to the plurality of components on the display screen so that the plurality of nodes are displayed along with the plurality of components so as to overlap the display of the plurality of components, and setting, in response to a user's instruction of association between two or more of the nodes, an association between two or more of the components corresponding to the two or more of the nodes.

Another embodiment can include a computer program product for making a computer function as an editing apparatus. The computer program product can include a computer readable storage medium having computer readable program code embodied therewith. The computer readable program code can include computer readable program code configured to perform the various processes and functions described herein.

The above-stated summary of the invention does not list all features necessary for the present invention, and a sub-combination of these feature groups can also constitute one or more embodiments of the invention.

DETAILED DESCRIPTION

The following describes the present invention by way of embodiments of the invention, which does not limit the invention according to the claims. Further, all combinations of the features described in the embodiments are not always necessary for means to solve the problem for invention.

Meanwhile, in order to create a display screen for mashups, an operation for editing the arrangement of components on the display screen and an operation for editing an association between the components have to be conducted separately. In one aspect, however, the arrangement of the components and an association between the components can be closely related with each other so that these two editing operations can be conducted in an integrated manner.

In one arrangement, an editing apparatus can include a component output unit for outputting a display screen on which a plurality of components are displayed; a node output unit for outputting a plurality of nodes respectively corresponding to the plurality of components on the display screen so that the nodes are displayed along with the plurality of components so as to overlap the display of the plurality of components; and a setting unit for setting an association between two or more of the components corresponding to two or more of the nodes in response to a user's instruction of association between the two or more nodes, and provides an editing method and a computer program product.

Figure 1:
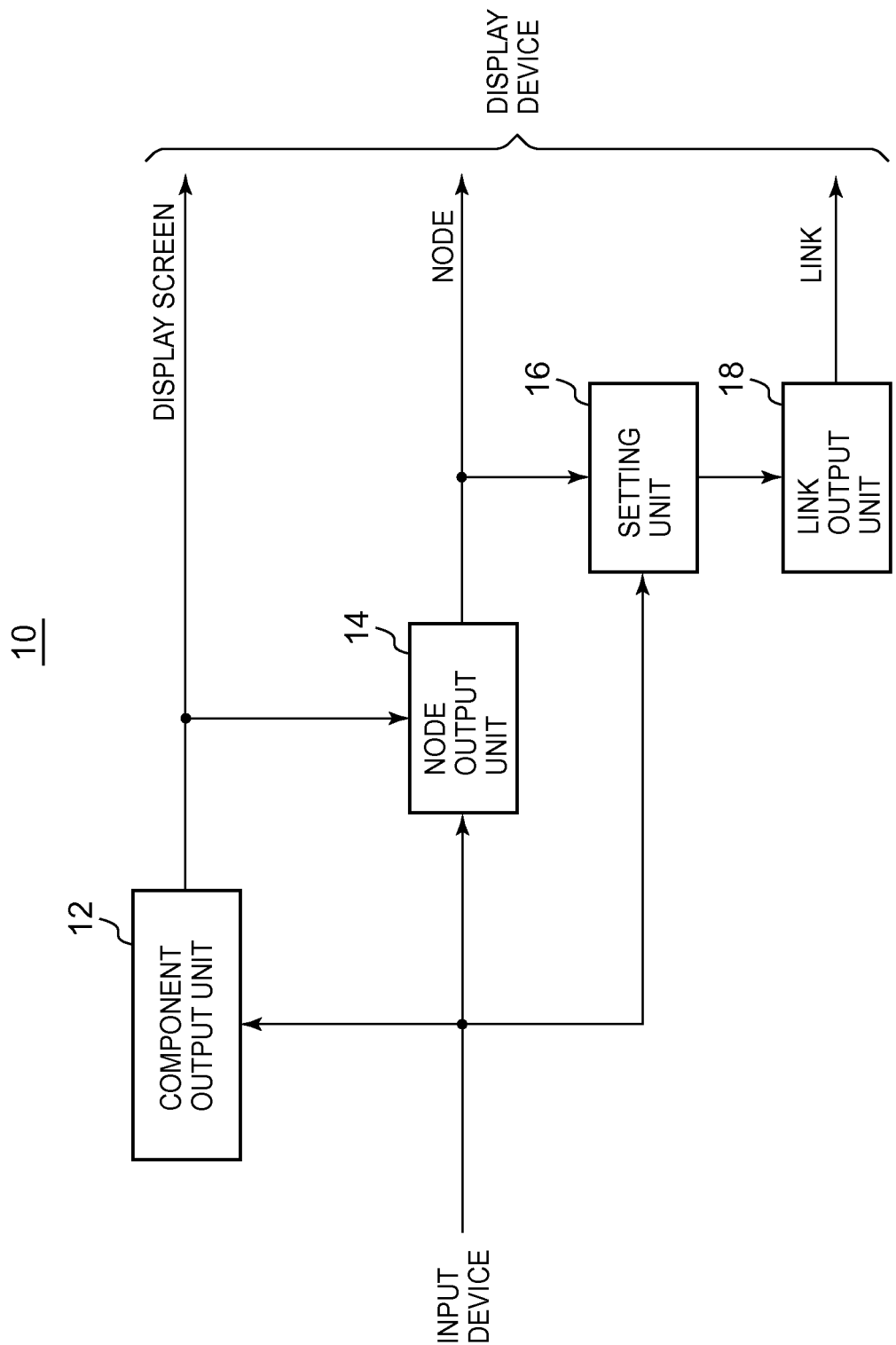
FIG. 1 illustrates a functional configuration of an editing apparatus 10 according to the present embodiment.

FIG. 1 illustrates a functional configuration of an editing apparatus 10 according to the present embodiment. The editing apparatus 10 supports editing of the arrangement of a plurality of components to be displayed on a display screen of a computer terminal and editing of the setting of an association between the components, thus facilitating user's operations.

Herein, each of the plurality of components may be any information that can be displayed on a display screen of a computer, including information acquired from a server, information output from a program, information stored in the computer and the like. Each of the plurality of components further can be a window with which an application program executed by the computer is associated, and that the corresponding application program outputs. Herein, this application program may be a small-scale program downloaded from a server by a browser or the like.

The setting of an association between the components may be any setting as long as it sets an association between two or more components, including setting of data and control passed from one component to another component. For instance, the setting of an association between components may be the setting for passing of at least one of data and control between two or more application programs associated with two or more components.

The editing apparatus 10 includes a component output unit 12, a node output unit 14, a setting unit 16, and a link output unit 18. The component output unit 12 outputs a display screen on which a plurality of components are displayed to a display device of a computer terminal. As an example, the component output unit 12 displays a plurality of components that a user designates using an input device of the computer terminal.

The node output unit 14 outputs a plurality of nodes respectively corresponding to the plurality of components on the display screen so that the nodes are displayed along with the plurality of components so as to overlap the display of the plurality of components. In this case, the node output unit 14 outputs the plurality of nodes on the display screen so that the plurality of nodes appear closer to a user than the plurality of components on the display screen.

That is, the component output unit 12 and the node output unit 14 display the plurality of components and the plurality of nodes respectively corresponding to the plurality of components so that they overlap one another. Along with this, the component output unit 12 and the node output unit 14 process images for display such that each of the plurality of components is located on a back side from a user and each of the plurality of nodes is located on a front side from the user.

The setting unit 16 sets, in response to a user's instruction of an association between two or more nodes using an input device, an association between two or more of components corresponding to the two or more of nodes.

The link output unit 18 further outputs, on the display screen, a link connecting the two or more nodes associated by the setting unit 16. As an example, the link output unit 18 processes images for display such that the link appears at the same height as the nodes from the user, i.e., the link appears closer to the user than the plurality of components.

Figure 2:
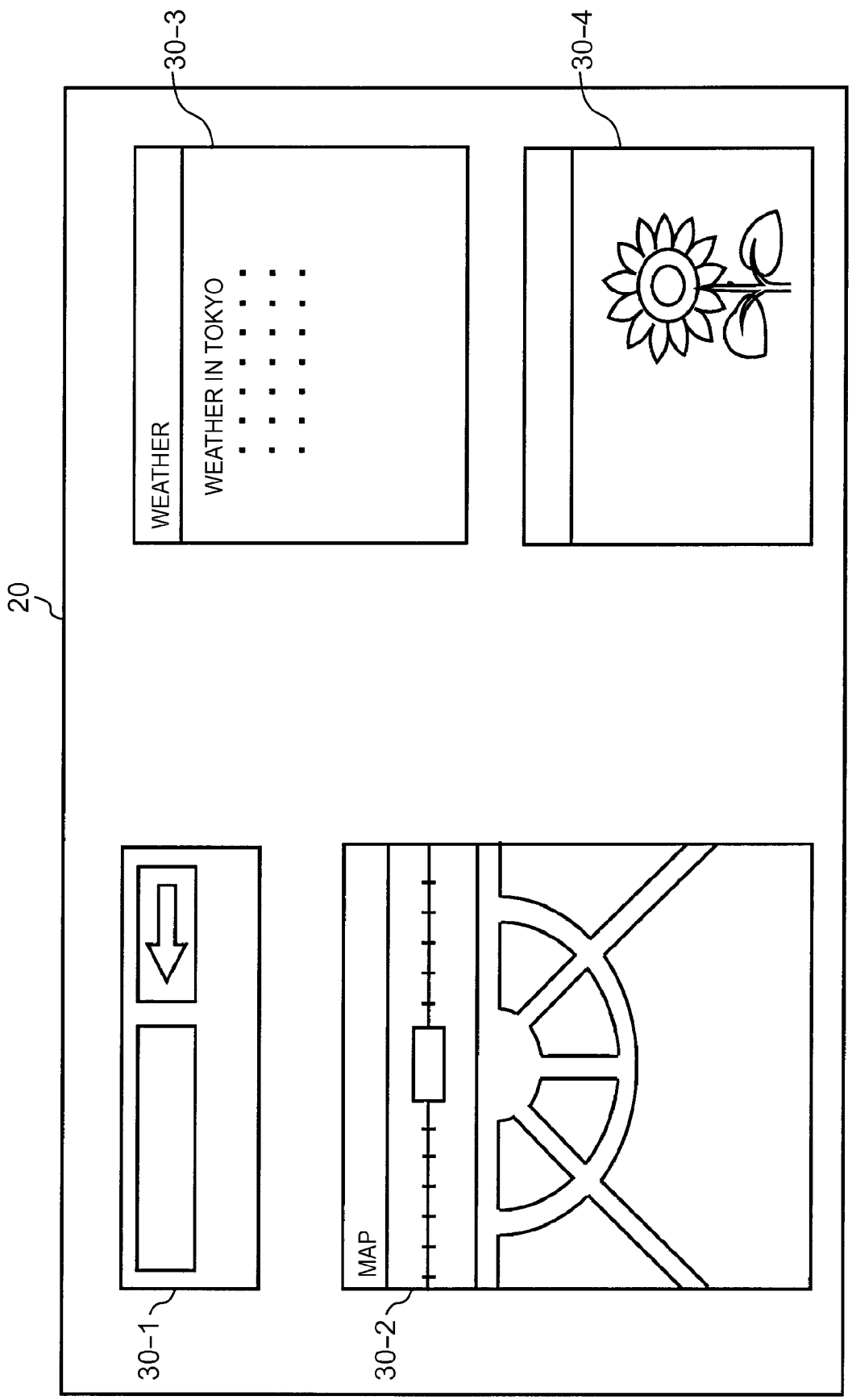
FIG. 2 illustrates exemplary components 30 displayed on a display screen 20 according to the present embodiment.

FIG. 2 illustrates exemplary components 30 displayed on a display screen 20 according to the present embodiment. Herein., although the editing apparatus 10 displays nodes and links together with the components 30, FIG. 2 does not show nodes and links for purposes of illustration. FIG. 2 illustrates, as the plurality of components 30 displayed on the display screen 20, a component 30-1 for execution of a search, a component 30-2 for display of map information, a component 30-3 for display of weather information, and a component 30-4 for display of photographs or the like.

Each of the plurality of components 30 is displayed on a position on the display screen 20 designated by a user. In response to an instruction from the user, the component output unit 12 of the editing apparatus 10 adds a component 30 on the display, screen 20, deletes a component 30 from the display screen 20, and changes the arrangement of the components 30 displayed on the display screen 20.

Figure 3:
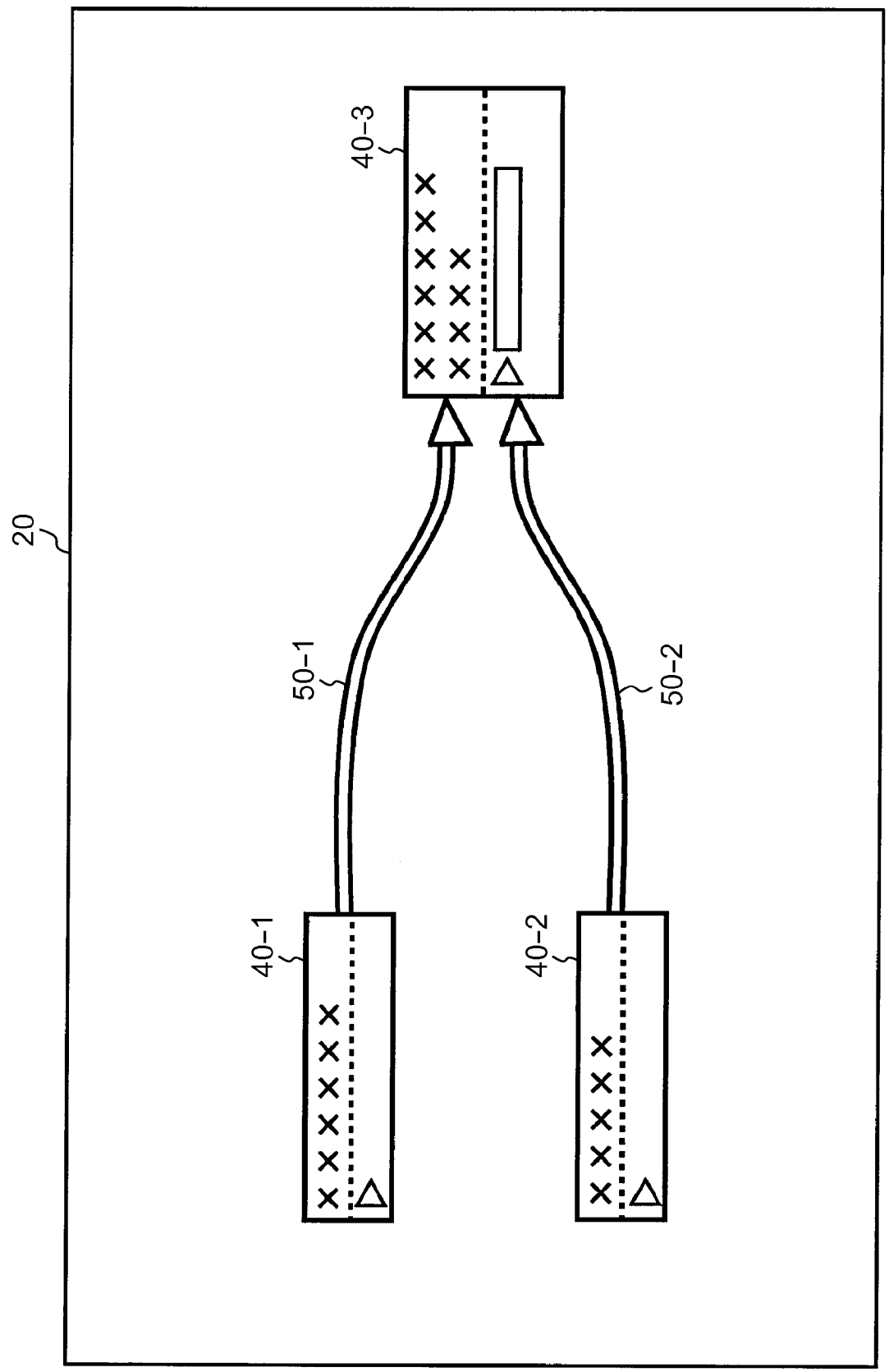
FIG. 3 illustrates exemplary nodes 40 and links 50 displayed on the display screen 20 according to the present embodiment.

FIG. 3 illustrates exemplary nodes 40 and links 50 displayed on the display screen 20 according to the present embodiment. Although the editing apparatus 10 displays components as well as the nodes 40 and the links 50, FIG. 3 does not show components for purposes of illustration.

The node output unit 14 of the editing apparatus 10 displays the nodes 40 on the display screen 20 so as to respectively correspond to the plurality of components displayed on the display screen 20. The nodes 40 may be displayed in any manner as long as it enables visual recognition of the existence of the corresponding components, for example, the nodes may be displayed using a box smaller than their corresponding components.

The link output unit 18 of the editing apparatus 10 displays, on the display screen 20, a link 50 connecting two or more nodes 40 between which an association has been set. The link 50 may be any display as long as it enables visual recognition of the connection between the two or more nodes 40, for example, the link may be a wire display connecting box-shaped nodes 40. If there is a direction (e.g., a transmission direction of data) of the association between the nodes 40, the link 50 having an arrow indicating the direction may be displayed on the display screen 20.

As another example, the node 40 may be one enabling selection of each property of the component 30 and enabling setting of the link 50 based on the selected property. The node 40 may display the selected property.

In response to an instruction from the user, the link output unit 18 of the editing apparatus 10 adds a link 50 on the display screen 20, or deletes a link 50 from the display screen 20. In response to an instruction from the user, the node output unit 14 of the editing apparatus 10 may move the display position of a node 40. When the display, position of a node 40 is moved, the link output unit 18 of the editing apparatus 10 moves the link 50 connected with the node 40 as well.

Figure 4:
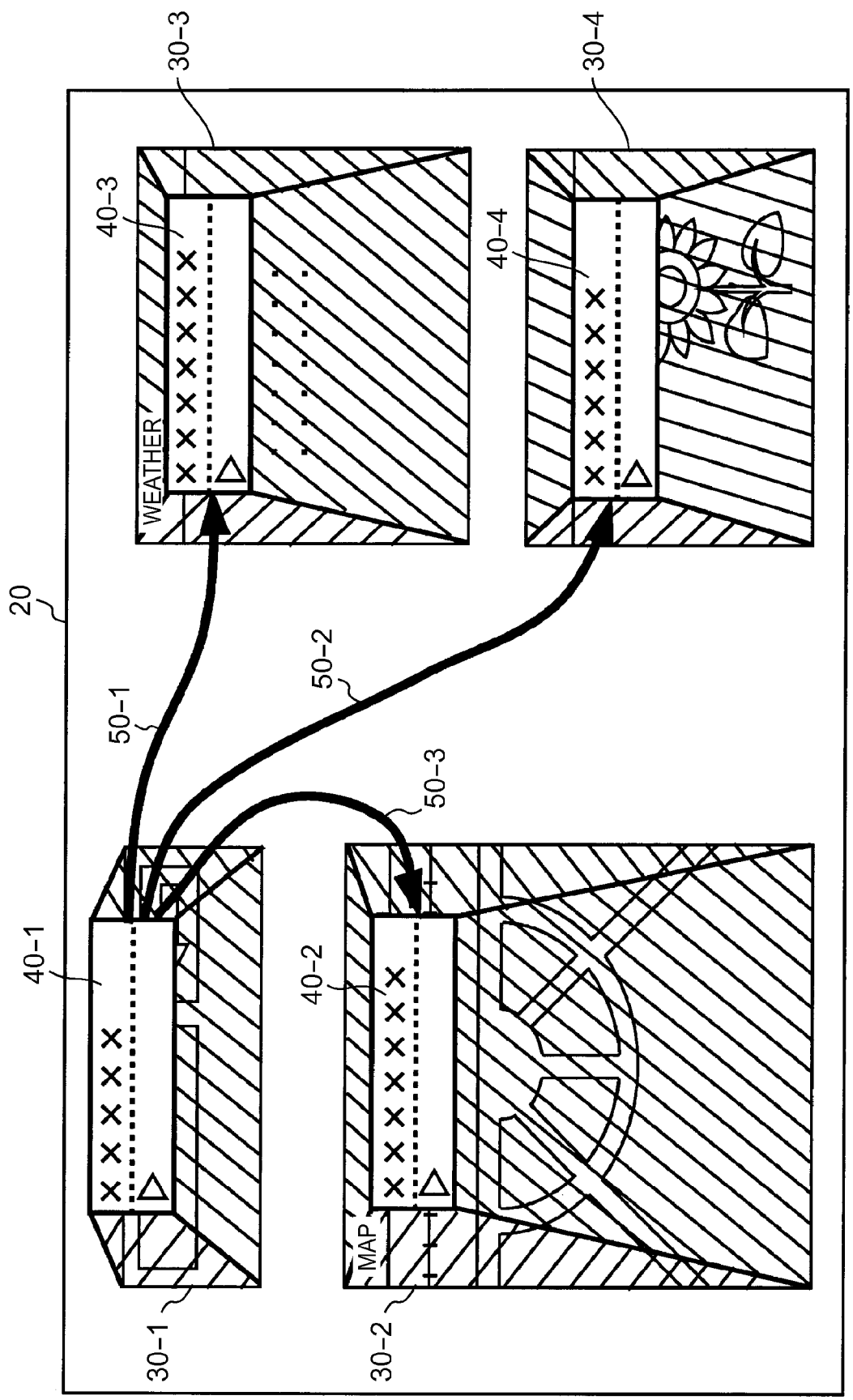
FIG. 4 illustrates first exemplary components 30, nodes 411, and links 50 displayed on the display screen 20 according to the present embodiment.

FIG. 4 illustrates first exemplary components 30, nodes 40, and links 50 displayed on the display screen 20 according to the present embodiment. The node output unit 14 displays a plurality of nodes 40 along with a plurality of components 30 so as to overlap them with the plurality of components 30, and outputs the same so that the plurality of nodes 40 appear closer to a user than the plurality of components 30.

As an example, as illustrated in FIG. 4, the node output unit 14 further outputs, on the display screen 20, an image of a three-dimensional shape having an upper face of a node 40 and a lower face of a component 30 viewed from the above. That is, the node output unit 14 displays side faces of the three-dimensional shape having the upper face of the node 40 and the lower face of the corresponding component 30 on the display screen 20. In this case, the node output unit 14 may display the side faces as transparent or as semitransparent.

Such display by the node output unit 14 allows the user to recognize the node 40 coming to the front at one level higher than the component 30. Such display by the node output unit 14 further allows the user to clearly recognize a correspondence relationship between the component 30 and the node 40.

The component output unit 12 may display the component 30 with brightness darker than brightness of the node 40. Thereby, the component output unit 12 can display the component 30 as clearly distinguished from the node 40.

As an example, the node output, unit 14 displays nodes 40 for all components 30 displayed on the display screen 20. As another example, the node output unit 14 may display only nodes 40 designated by the user on the display screen 20.

Figure 5:
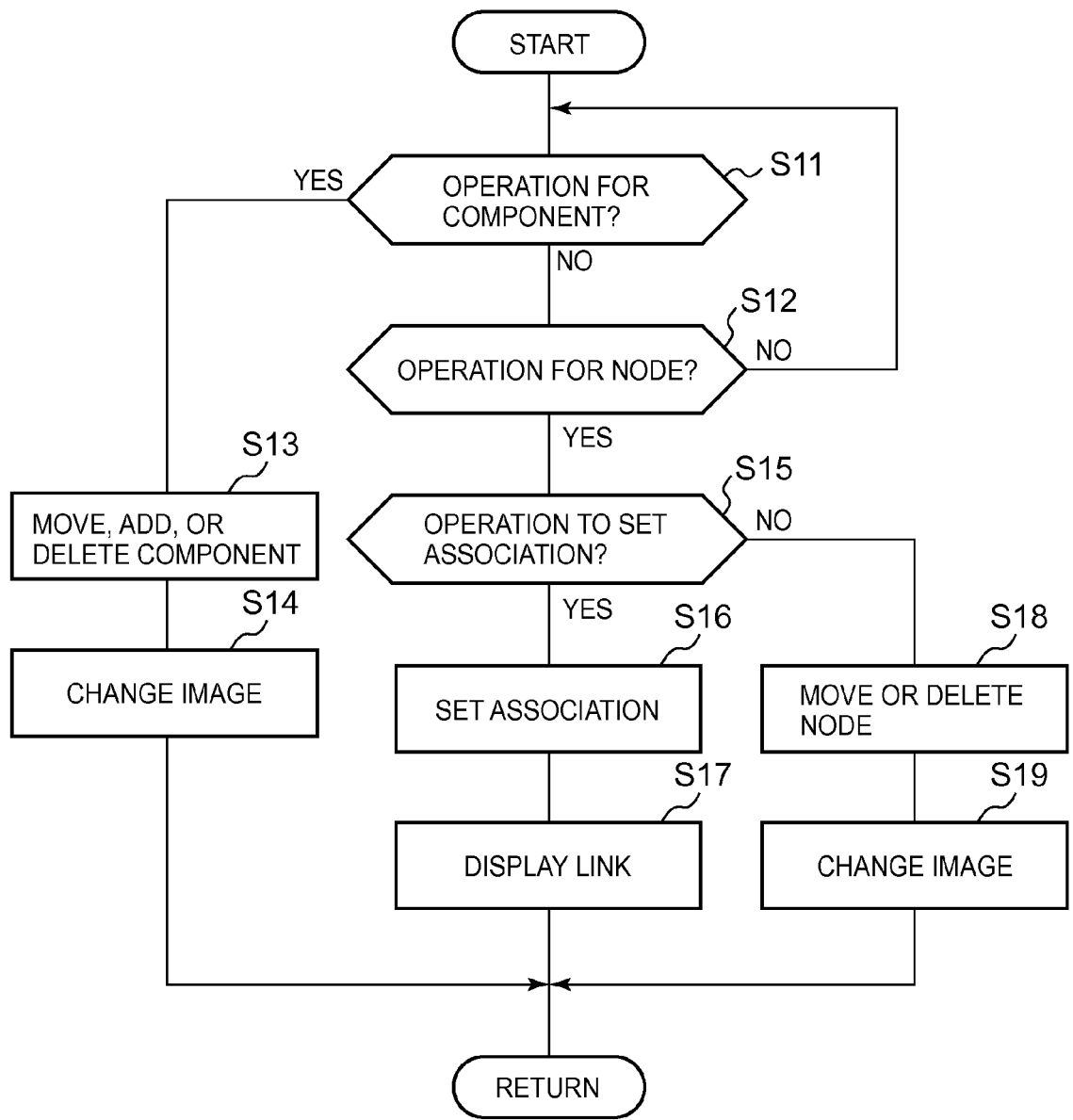
FIG. 5 illustrates an exemplary processing flow of the editing apparatus 10 according to the present embodiment.

FIG. 5 illustrates an exemplary processing flow of the editing apparatus 10 according to the present embodiment. In the state where the display screen 20 is displayed on a display device, the editing apparatus 10 determines whether an operation for any component 30 is conducted, and whether an operation for any node 40 is conducted ((S11, S12). If any operation is not conducted (No at S11 and No at S12) the editing apparatus 10 stands by for processing at Step S11 and Step S12.

If any operation is conducted to a component 30 (Yes at S11), and if the operation is a moving operation of the component 30, the component output unit 12 of the editing apparatus 10 moves the component 30 as an operation target to a designated position on the display screen 20 (S13). If the operation is a deletion operation of a component 30, the component output unit 12 deletes the component 30 as an operation target from the display screen 20. If the operation is an add operation of a new component 30, the component output unit 12 adds the new component 30 on the display screen 20.

Subsequently, if a moving operation of the component 30 is conducted at Step S13, the node output unit 14 changes an image showing a node 40 closer to a user than the corresponding component 30 as the operation target in response to the movement of the component 30 as the operation target (S14). When an image of a three-dimensional shape having an upper face of the node 40 and a lower face of the component 30 viewed from the above is displayed, the node output unit 14 changes an image showing side faces of the three-dimensional shape in response to the movement of the component 30 as the operation target. The node output unit 14 may display the component 30 with brightness decreasing in accordance with a difference between the positions of the component 30 and the node 40.

If the component 30 is deleted at Step S13, the node output unit 14 deletes the node 40 corresponding to the component 30 as the operation target and the image showing the node 40 closer to the user. If a new component 30 is added at Step S13, the node output unit 14 adds a node 40 corresponding to the new component 30, and adds an image showing the node 40 corresponding to the new component 30 closer to the user.

If any operation is conducted to a node 40 (Yes at S12), the setting unit 16 of the editing apparatus 10 further determines whether an operation setting an association between nodes is conducted or not (S15). If an operation is conducted to set an association between nodes (Yes at S15), the setting unit 16 sets an association between two or more components corresponding to between the designated two or more nodes (S16). Subsequently, the link output unit 18 displays a new link 50 connecting the two or more nodes associated at Step S16 on the display screen 20 (S17).

If no operation is conducted to set an association between nodes (No at S15), and if the operation is a moving operation of a node 40, the node output unit 14 of the editing apparatus 10 moves the node 40 as an operation target to a designated position on the display screen 20 (S18). If the operation is a deletion operation of a node 40, the node output unit 14 deletes the node 40 as the operation target from the display screen 20.

Subsequently, if a moving operation of a node 40 is conducted at Step S18, the node output unit 14 changes an image showing the node 40 as the operation target closer to the user in response to the movement of the node 40 (S19). When an image of a three-dimensional shape having an upper face of the node 40 and a lower face of the component 30 viewed from the above is displayed, the node output unit 14 changes an image showing side faces of the three-dimensional shape in response to the movement of the node 40 as the operation target. If a node 40 is deleted at Step S18, the node output unit 14 deletes an image showing the node 40 as the operation target closer to the user.

After any processing of Step S14, Step S17, and Step S19 is finished, the editing apparatus 10 returns the procedure to Step S11. Then, the editing apparatus 10 stands by for processing until a next operation is conducted to a component 30 or to a node 40.

Such an editing apparatus 10 allows a user to recognize a node 40 closer than a component 30, and therefore it enables both of the operations of editing the arrangement of components 30 and editing the setting of an association between components to be conducted on the same display screen 20. Further, the editing apparatus 10 enables clear recognition of a correspondence relationship between a component 30 and a node 40, and therefore recognition of an association between components is enabled while editing the arrangement of components 30, or recognition of arrangement of components is enabled while editing the setting of an association between components.

Note here that the editing apparatus 10 may have a distinction between an operation mode of editing the arrangement of components 30 and an operation mode of setting an association between components. In this case, in the operation mode of editing the arrangement of components 30, the editing apparatus 10 prohibits an operation to nodes 40.

In the operation mode of setting an association between components, the editing apparatus 10 prohibits an operation to components 30. Thereby, the editing apparatus 10 can avoid an erroneous operation of a node 40 in spite of the intention to edit the arrangement of components 30, or an erroneous operation to move the arrangement of components 30 in spite of the intention to set an association between components.

Figure 6:
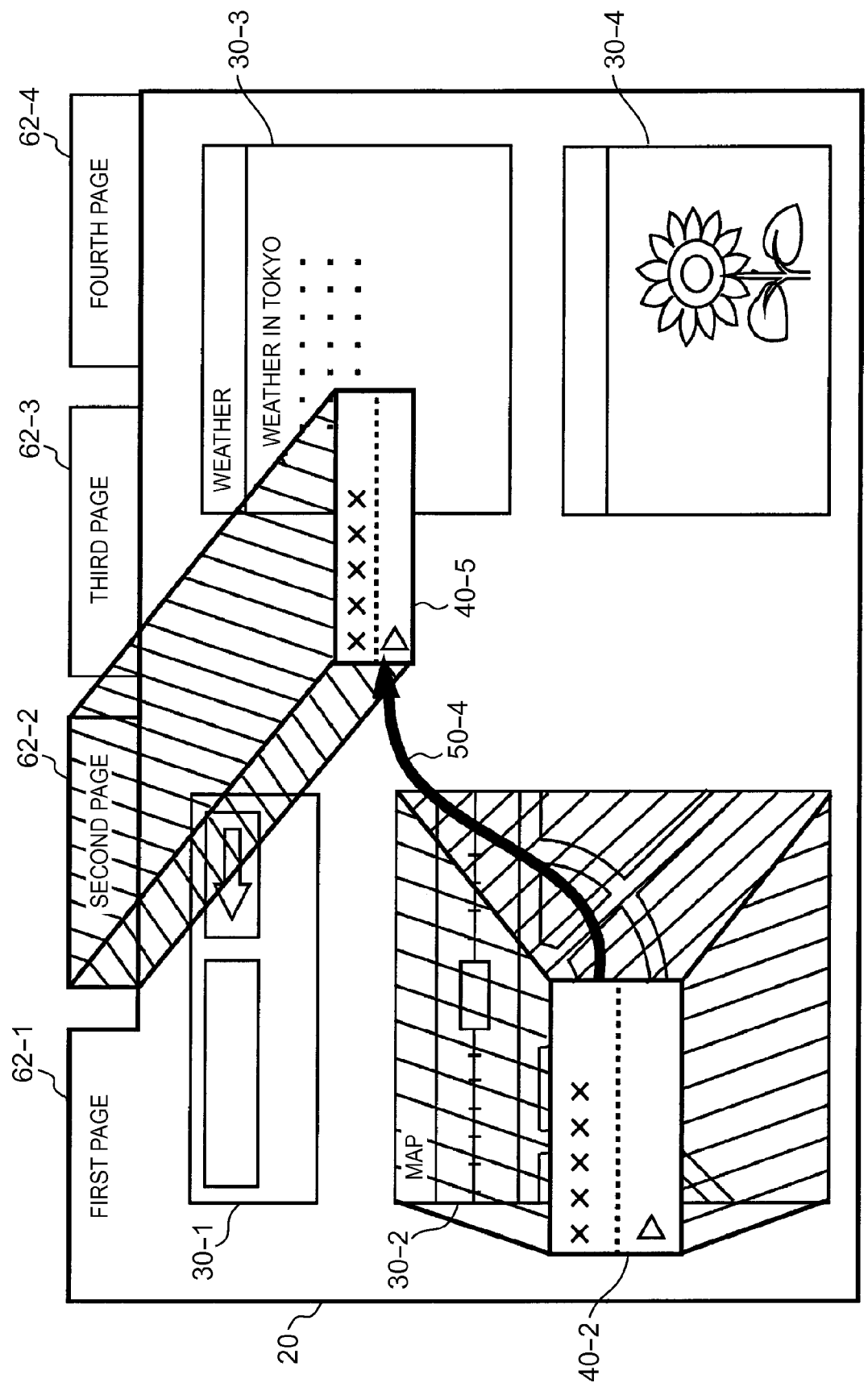
FIG. 6 illustrates second exemplary components 30, nodes 40 and links 50 displayed on a display screen 20 according to the present embodiment.

FIG. 6 illustrates second exemplary components 30, nodes 40 and links 50 displayed on a display screen 20 according to the present embodiment. The editing apparatus 10 can edit the display screen 20 having a plurality of tabs 62. Such a display screen 20 switches the contents displayed in a display region in accordance with a tab 62 selected by a user.

When editing such a display screen 20, the component output unit 12 outputs each of at least one components 30, each associated with a tab 62, to a common display region in response to a selection of the corresponding tab 62. Then, for a node 40 associated with a component 30 whose corresponding tab 62 is not selected among at least one of components 30 each associated with a tab 62, the node output unit 14 further outputs an image having an upper face of the node 40 and a lower face as the tab 62 viewed from the above on the display screen 20.

For instance, in the example of FIG. 6, a tab 62-1 to display a first page is selected. In this case, as for a node 40-5 corresponding to a component 30 included in a second page, the node output unit 14 displays an image having an upper face of the node 40-5 and a lower face of a tab 62-2 to display the second page viewed from the above. Thereby, the editing apparatus 10 enables a user to visually recognize the setting of an association between the components 30 associated with different tabs 62.

As another example, irrespective of the selection or non-selection of a tab 62 corresponding to one component 30, the node output unit 14 outputs a node 40 corresponding to the component 30 at the same position on the display screen 20. That is, even when a tab 62 selected is switched, the node output unit 14 continues to display the node 40 at the same position. Thereby, the editing apparatus 10 can keep the display of nodes 40 and links 50 unchanged before and after the switching of tabs 62.

Herein, the editing apparatus 10 can edit a display screen 20 having a display interface other than tabs 62 (e.g., accordion container and tree menu). In the case where such a display screen 20 is edited, the component output unit 12 outputs a plurality of images for selection (e.g., tabs 62, selection bars for accordion container, menu text in tree menu). Along with this, the component output unit 12 outputs, in response to selection of one selection image among a plurality of selection images, a component 30 corresponding to the selection image to a common display region, and does not allow a component 30 corresponding to another selection image to be output to a display region.

For a node 40 associated with a component 30 whose corresponding selection image is not selected among at least one components 30 each associated with a selection image, the node output unit 14 further outputs, on the display screen, an image having an upper face of the node 40 and a lower face of the selection image viewed from the above. Thereby, the editing apparatus 10 allows a user to visually recognize the setting of an association between the components 30 associated with different selection images.

Figure 7:
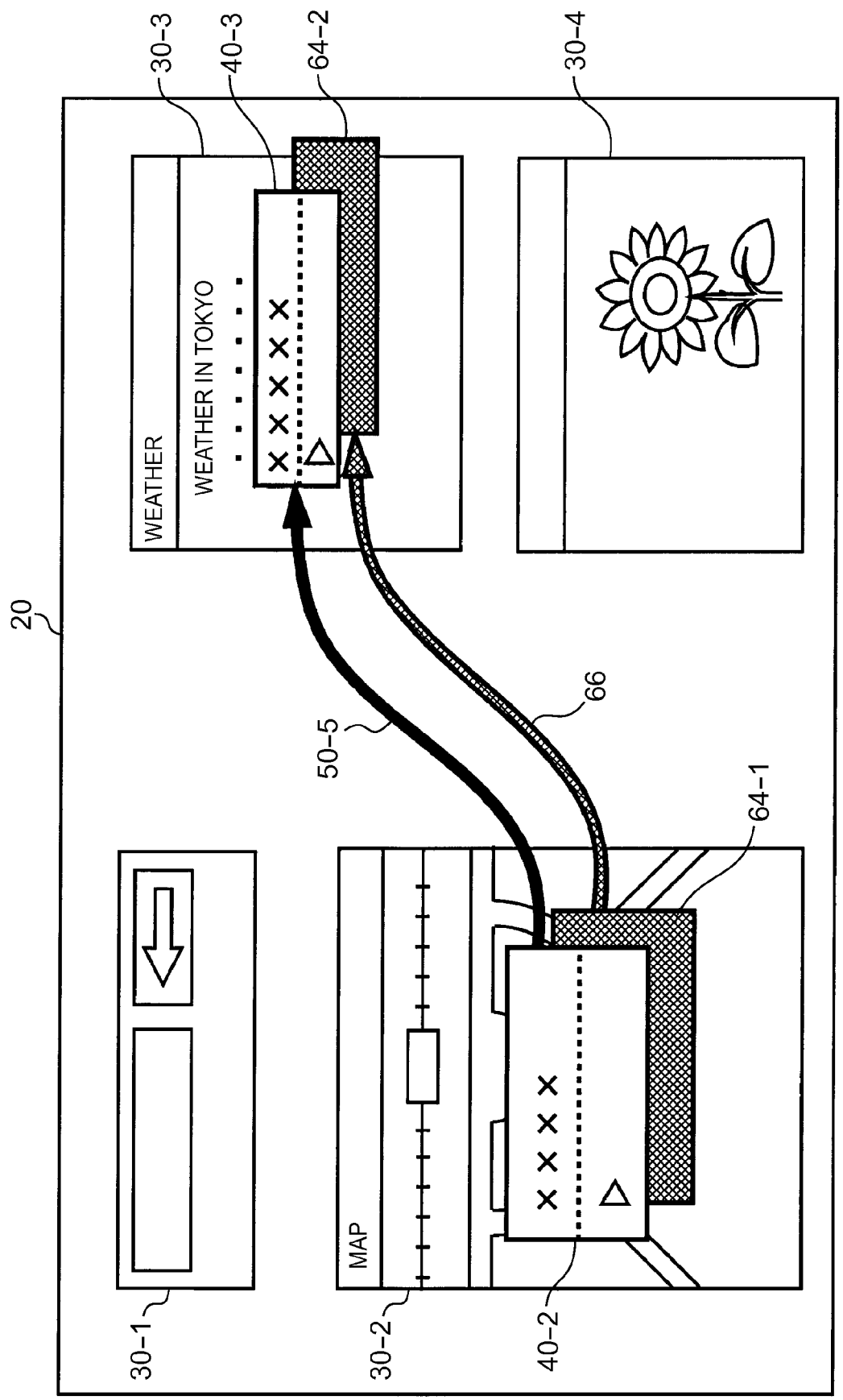
FIG. 7 illustrates third exemplary components 30, nodes 40 and links 50 displayed on a display screen 20 according to the present embodiment.

FIG. 7 illustrates third exemplary components 30, nodes 40 and links 50 displayed on a display screen 20 according to the present embodiment. As an example, the node output unit 14 may further output a shadow 64 of each of a plurality of nodes 40 on a plurality of components 30 on the display screen 20. Further, as an example, the link output unit 18 may output a shadow 66 of a link 50 on the display screen 20.

The editing apparatus 10 can make a user to feel a height difference between the component 30 and the node 40 by displaying the shadow 64 of the node 40, thus allowing the user to recognize the node 40 coming to the front at one level higher than the component 30. The editing apparatus 10 can make a user to feel the link 50 also coming to the front at one level higher by displaying the shadow 66 of the link 50.

Figure 8:
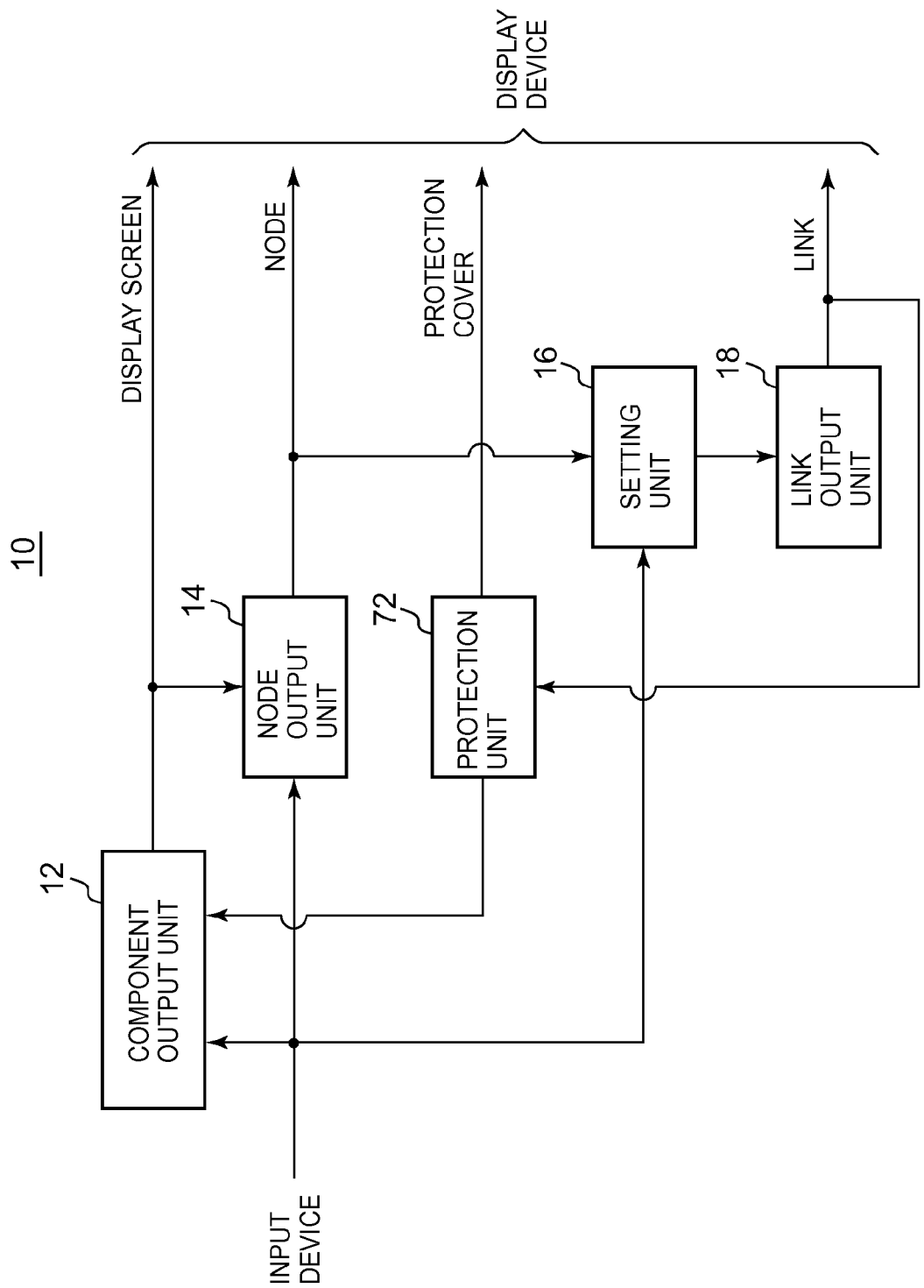
FIG. 8 illustrates a functional configuration of an editing apparatus 10 according to a first modification example of the present embodiment.

FIG. 8 illustrates a functional configuration of an editing apparatus 10 according to a first modification example of the present embodiment. Since the editing apparatus 10 according to this modification example has substantially the same configuration and functions as those of the editing apparatus 10 according to the present embodiment described with reference to FIGS. 1 to 7, the same reference numerals are assigned to the elements with the same configuration and function as the elements included in the editing apparatus 10 according to the present embodiment, and the description thereof is omitted except for the following different points.

A component output unit 12 according to this modification example outputs a plurality of components 30 to a first layer on a display screen 20. A node output unit 14 according to this modification example outputs a plurality of nodes 40 to a second layer above the first layer on the display screen 20. A link output unit 18 according to this modification example outputs a link 50 to the second layer on the display screen 20.

The editing apparatus 10 according to this first modification example further includes a protection unit 72. When a user instructs association between two or more nodes 40, the protection unit 72 outputs a semi-transparent protection cover 74 to a third layer between the first layer and the second layer. In this case, the protection unit 72 prevents selection of a plurality of components 30 in the first layer.

Figure 9:
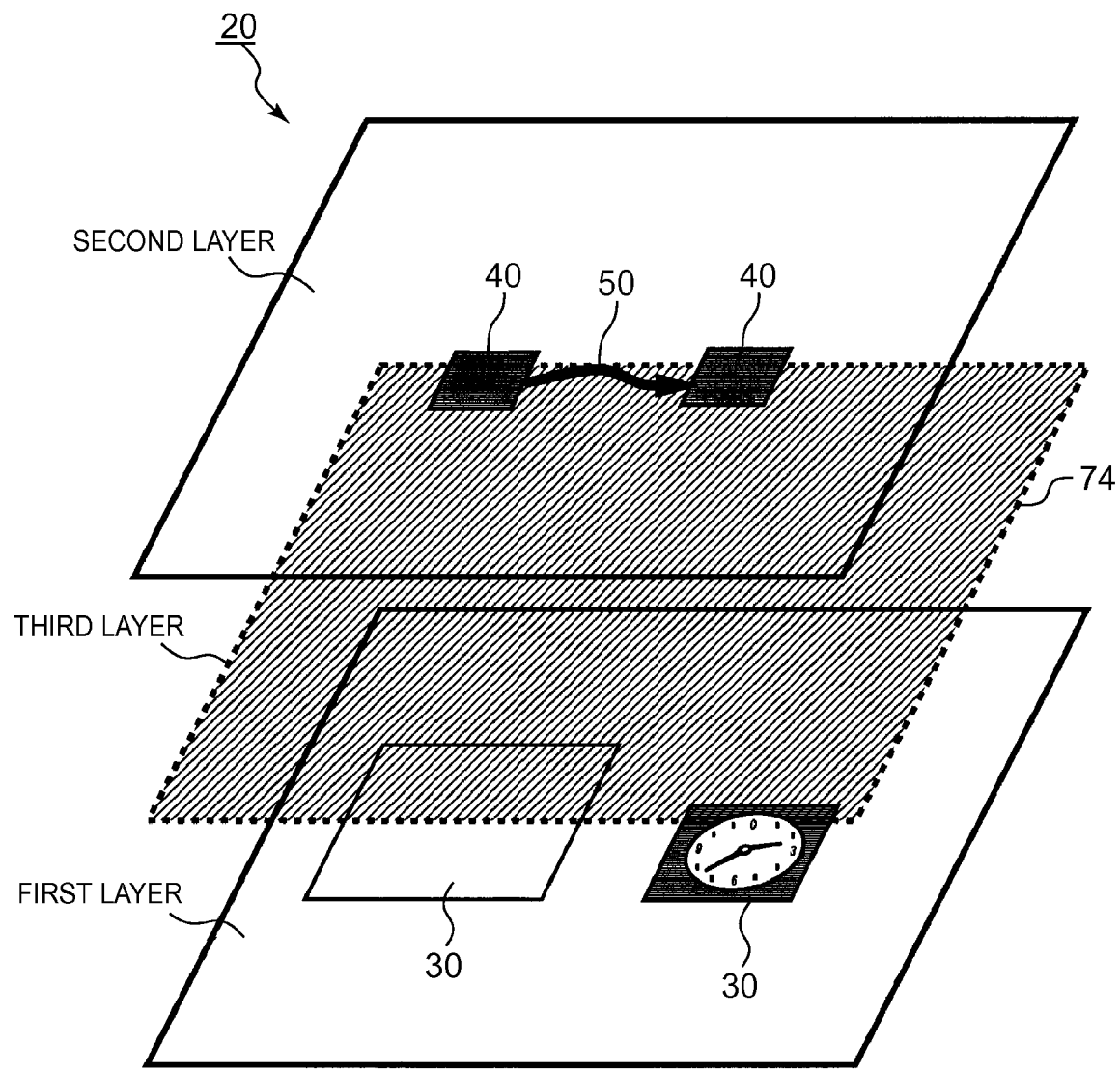
FIG. 9 illustrates a configuration of layers in the display screen 20 according to the first modification example of the present embodiment.

FIG. 9 illustrates a configuration of layers in the display screen 20 according to the first modification example of the present embodiment. As illustrated in FIG. 9, in this modification example, the display screen 20 includes the third layer set on the first layer, and the second layer on the third layer. When different objects are displayed in the same region, the display screen 20 displays so that an object arranged in an upper layer appears to a user with priority, The editing apparatus 10 displays a plurality of components 30 arranged in the first layer below the semi-transparent protection cover 74 arranged in the third layer. The editing apparatus 10 displays a plurality of nodes 40 and links 50 arranged in the second layer above the semi-transparent protection cover 74 arranged in the third layer.

Thus, the editing apparatus 10 allows the user to recognize the nodes 40 and the links 50 closer to the user side than the components 30, and can achieve a clear correspondence relationship between the components 30 and the nodes 40. Thereby, the editing apparatus 10 enables recognition of the arrangement of components while editing setting of an association between the components. Further, the editing apparatus 10 prevents a component 30 displayed below the protection cover 74 from being selected, thus preventing erroneous movement of the component 30 during editing of the setting of an association between components.

Figure 10:
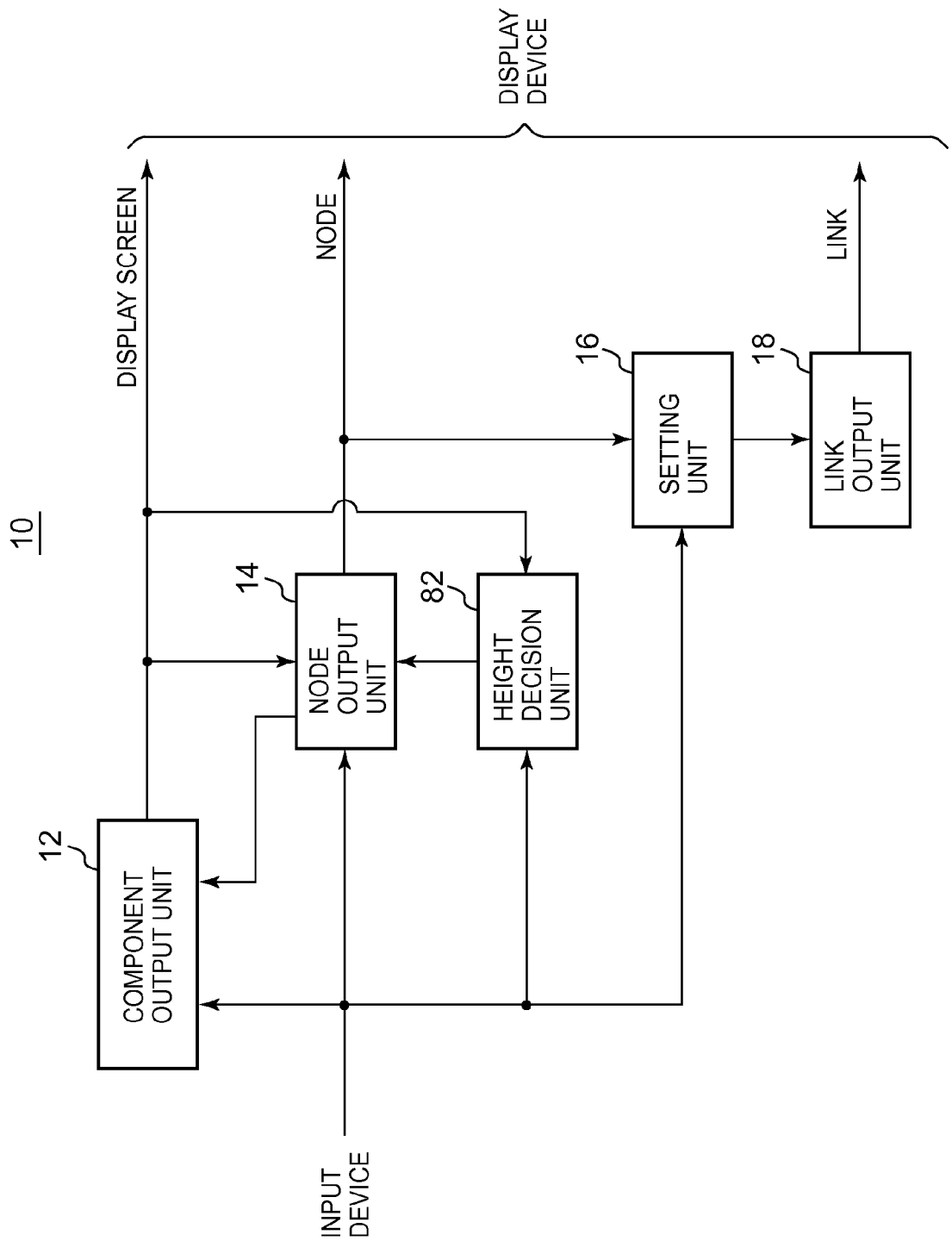
FIG. 10 illustrates a functional configuration of an editing apparatus 10 according to a second modification example of the present embodiment.
Figure 11:
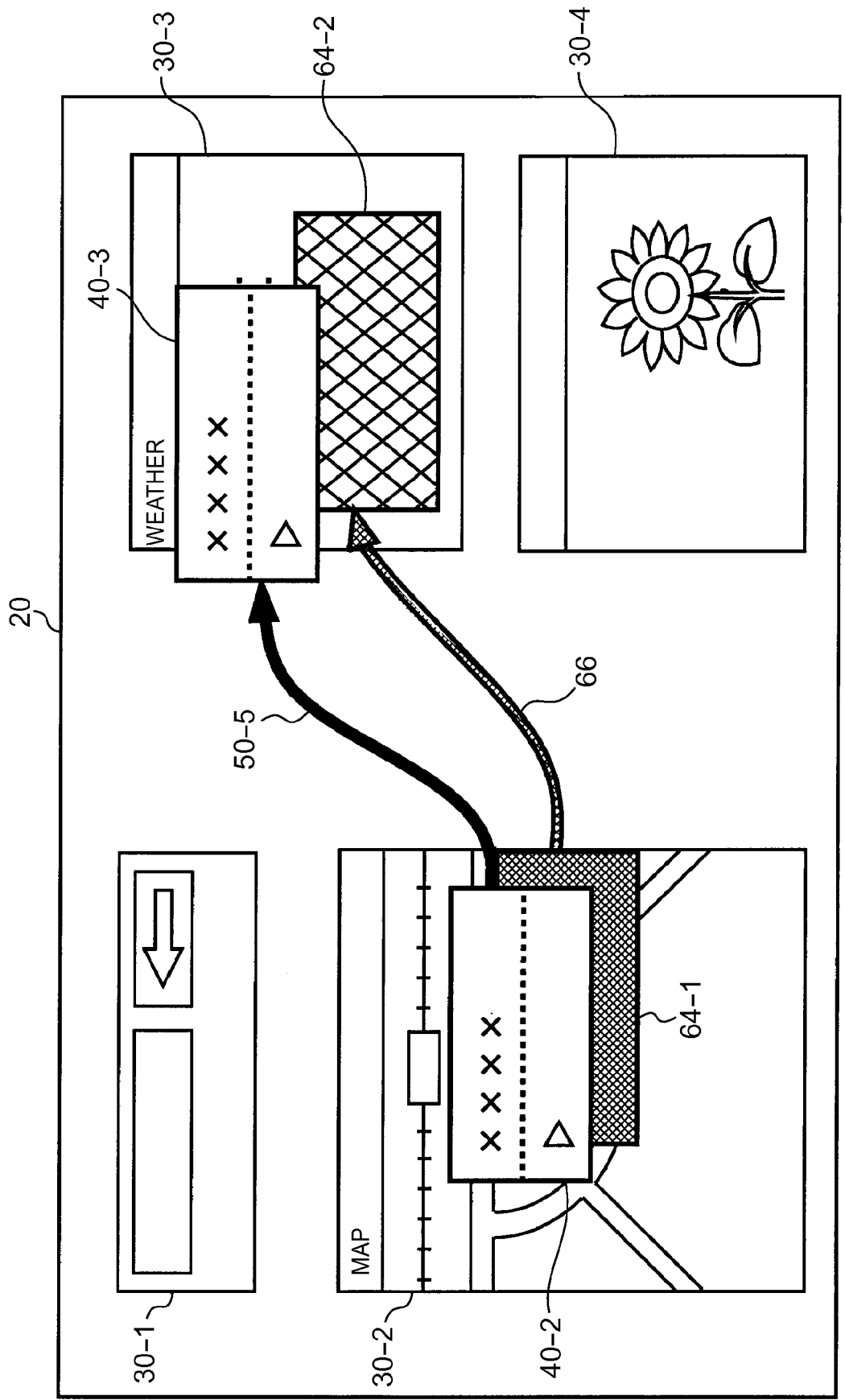
FIG. 11 illustrates exemplary components 30, nodes 40 and links 50 displayed on a display screen 20 according to the second modification example of the present embodiment.

FIG. 10 illustrates a functional configuration of an editing apparatus 10 according to a second modification example of the present embodiment. FIG. 11 illustrates exemplary components 30, nodes 40 and links 50 displayed on a display screen 20 according to the second modification example of the present embodiment. Since the editing apparatus 10 according to this modification example has substantially the same configuration and functions as those of the editing apparatus 10 according to the present embodiment described with reference to FIGS. 1 to 7, the same reference numerals are assigned to the elements with the same configuration and function as the elements included in the editing apparatus 10 according to the present embodiment, and the description thereof is omitted except for the following different points.

A component output unit 12 according to this modification example further includes a height decision unit 82. The height decision unit 82 decides a height of each of nodes 40 with reference to a plurality of components 30. As an example, the height decision unit 82 decides a height of each of the nodes 40 based on an overlapping order of the plurality of components 30, a data transfer direction between the plurality of components 30, frequency of operations conducted to the nodes 40, and history of the operations conducted to the nodes 40.

As illustrated in FIG. 11, for example, a node output unit 14 according to this modification example outputs the plurality of nodes 40 on the display screen 20 so that each of the plurality of nodes 40 appears higher than each of the plurality of components 30 by a height decided by the height decision unit 82. Thereby, the editing apparatus 10 allows a user to recognize the plurality of components 30 as distinguished from each other.

As an example, the node output unit 14 outputs a shadow 64 fix each of the plurality of nodes 40, where a distance between a node 40 and the corresponding Shadow 64 changes with a height. For instance, as the height of a node 40 increases, the node output unit 14 increases a distance between the node and the corresponding shadow 64. Further, the node output unit 14 may change the degree of shading of a shadow 64. For instance, the node output unit 14 displays a shadow 64 corresponding to a node 40 with a larger height more lightly. Thereby, the node output unit 14 can output nodes 40 with a height appearing variably.

Further, the component output unit 12 according to this modification example highlights, in response to designation by a user of one node 40, a component 30 corresponding to the node 40. For instance, the component output unit 12 displays a focus frame to the component 30 corresponding to the designated one node 40, highlights the component 30, or displays the component 30 in a different color. Thereby, the editing apparatus 10 according to this modification example enables a user to easily recognize the component 30 corresponding to the designated node 40 to set an association between components.

Figure 12:
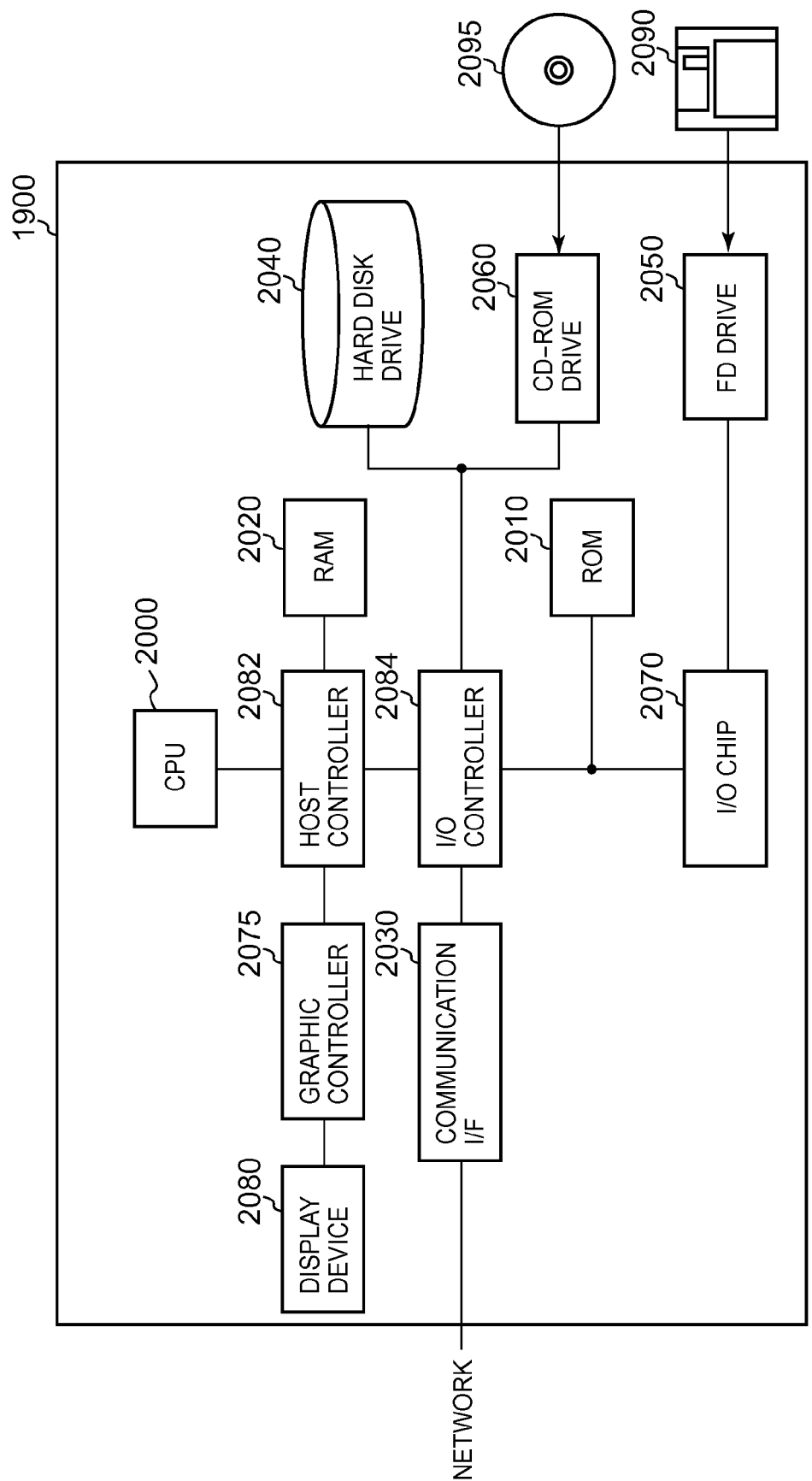
FIG. 12 illustrates an exemplary hardware configuration of a computer 1900 according to the present embodiment.

FIG. 12 illustrates an exemplary hardware configuration of a computer 1900 according to the present embodiment. The computer 1900 according to the present embodiment includes: a CPU peripheral part including a CPU 2000, a RAM 2020 and a graphic controller 2075 mutually connected with a host controller 2082 and a display device 2080; an input/output part including a communication interface 2030 connected with the host controller 2082 by an input/output controller 2084, a hard disk drive 2040, and a CD-ROM drive 2060; and a legacy input/output unit including a ROM 2010 connected with the input/output controller 2084, a flexible disk drive 2050 and an input/output chip 2070.

The host controller 2082 connects the RAM 2020 with the CPU 2000 that accesses the RAM 2020 at a high transfer rate and the graphic controller 2075. The CPU 2000 operates in accordance with programs stored in the ROM 2010 and the RAM 2020 to control respective parts. The graphic controller 2075 acquires image data generated by the CPU 2000 or the like on a frame buffer provided in the RAN 2020, and displays the same on the display device 2080. Instead of this, the graphic controller 2075 may include a frame buffer therein that stores image data generated by the CPU 2000 or the like.

The input/output controller 2084 connects the host controller 2082 with the communication interface 2030 as a relatively high-speed input/output device, the hard disk drive 2040, and the CD-ROM drive 2060. The communication interface 2030 communicates with other devices via a network. The hard disk drive 2040 stores programs and data used by the CPU 2000 in the computer 1900. The CD-ROM drive 2060 reads programs or data from a CD-ROM 2095 and provides the same to the hard disk drive 2040 via the RAM 2020.

The input/output controller 2084 further connects with relatively low-speed input devices of the ROM 2010, the flexible disk drive 2050 and the input/output chip 2070. The ROM 2010 stores a boot program that the computer 1900 executes at startup and/or a program depending on hardware of the computer 1900. The flexible disk drive 2050 reads programs or data from a flexible disk 2090, and provides the same to the hard disk drive 2040 via the RAM 2020. The input/output chip 2070 connects the flexible disk drive 2050 with the input/output controller 2084, while connecting various types of input/output devices with the input/output controller 2084 via a parallel port, a serial port, a keyboard port, a mouse port and the like.

A program provided to the hard disk drive 2040 via the RAM 2020 is stored in a recording medium such as the flexible disk 2090, the CD-ROM 2095, or an IC card, and is provided by a user. The program is read from the recording medium, and is installed to the hard disk drive 2040 in the computer 1900 via the RAM 2020 for execution by the CPU 2000.

A program installed in the computer 1900 and that makes the computer 1900 function as the editing apparatus 10 includes a component output module, a node output module, a setting module and a link output module. These program or modules acts on the CPU 2000 or the like, thus making the computer 1900 function as the component output unit 12, the node output unit 14, the setting unit 16 and the link output unit 18.

Information processing described in these programs is read in the computer 1900, thereby functioning as the component output unit 12, the node output unit 14, the setting unit 16 and the link output unit 18 as specific means obtained by cooperation of the software and the above-described various types of hardware resources. Then, such specific means implements calculations or processing of information depending on an intended purpose of the computer 1900 of the present embodiment, thus configuring a specific editing apparatus 10 depending on the intended purpose.

As an example, when communication is conducted between the computer 1900 and an external device or the like, the CPU 2000 executes a communication program loaded on the RAM 2020, and instructs the communication interface 2030 about communication processing based on the processing contents described in the communication program. Under control by the CPU 2000, the communication interface 2030 reads transmission data stored in a transmission buffer region or the like provided on a storage device such as the RAM 2020, the hard disk drive 2040, the flexible disk 2090, or the CD-ROM 2095, and transmits the same to a network, or writes reception data received from a network to a reception buffer region or the like provided on the storage device. In this way, the communication interface 2030 may transfer transmission/reception data with respect, to the storage device by a DMA (direct memory access) method, or instead the CPU 2000 may read data from a storage device as a transfer source or the communication interface 2030 and writes the data to the communication interface 2030 as a transfer destination or the storage device to transfer transmission/reception data.

Further, the CPU 2000 causes all or a required part of files, databases or the like stored in an external storage device such as the hard disk drive 2040, the CD-ROM drive 2060 (CD-ROM 2095), or the flexible disk drive 2050 (flexible disk 2090) to be read to the RAM 2020 by DMA transfer or the like, and conducts various processing with respect to the data on the RAM 2020. Then, the CPU 2000 writes the data subjected to the processing back to the external storage device by DMA transfer or the like. In such processing, the RAM 2020 can be considered temporally keeping the contents of the external storage device, and therefore the RAM 2020 and the external storage device and the like are generally called as a memory, a storage unit or a storage device in the present embodiment. Various types of information such as various types of programs, data, tables, and databases in the present embodiment are stored in such a storage device, and are subjected to information processing. Herein, the CPU 2000 can keep a part of the RAM 2020 in a cache memory for reading/writing on the cache memory. In such an embodiment also, since the cache memory plays a part of the function as the RAM 2020, the cache memory also can be considered to be included in the RAM 2020, a memory and/or a storage device in the present embodiment, unless it is to be described separately.

Further, the CPU 2000 conducts various processing described in the present embodiment including various calculations, information processing, condition estimation, search and replace of information, designated by an instruction sequence of a program, with respect to data read from the RAM 2020, and writes the same back to the RAM 2020. For instance, in the case of conducting condition estimation, the CPU 2000 compares various types of variables described in the present embodiment with other variables or constants, and determines whether such variables satisfy a condition such as more than, less than, more than or equal to, less than or equal to, or equal to. If the condition is satisfied (or not satisfied), the procedure branches off to a different instruction sequence or a sub-routine is called.

Further, the CPU 2000 can search information stored in files, databases or the like in the storage device. For instance, in the case where a plurality of entries including an attribute value of a first attribute each associated with an attribute value of a second attribute is stored in the storage device, the CPU 2000 searches an entry with an attribute value of the first attribute agreeing with a designated condition among the plurality of entries stored in the storage device, and reads an attribute value of the second attribute stored in the entry, whereby an attribute value of the second attribute associated with the first attribute satisfying a predetermined condition can be obtained.

The programs or the modules described above may be stored in an external recording medium. As the recording medium, an optical recording medium such as a DVD or a CD, a magneto-optical recording medium such as a MO, a tape medium, a semiconductor memory such as an IC card can be used, for example as well as the flexible disk 2090 and the CD-ROM 2095. A storage device such as a hard disk or a RAM provided in a server system connected with a private communication network or the Internet may be used as the recording medium to provide programs to the computer 1900 through the network.

That is the description of the present invention, by way of embodiments. The technical scope of the present invention, however, is not limited to the scope described in the above-stated embodiments. It should be appreciated by those skilled in the art that various modifications or improvements can be added to the above-stated embodiments. Embodiments including such modifications or improvements also can be included in the technical scope of the present invention based on the recitation of claims.

The execution order in each processing such as the operations, procedures, steps and stages in the devices, the systems, the programs, and the methods described in claims, the specification, and the drawings does not clearly describe "before" and "prior to" and the like especially, and it should be noted that they can be achieved by any order unless the following processing uses an output from the preceding processing. Regarding operation flows in claims, the specification and the drawings, even when the description is made using "firstly" and "next" or the like for convenience, such a description does not mean that execution in this order is indispensable.

The invention claimed is:

1. A computer hardware system, comprising:
at least one hardware processor configured to initiate and/or perform:
  outputting, to a display screen, a plurality of concurrently-displayed software components;
  outputting, to the display screen, a protection layer between a first layer and a second layer;
  outputting, to the display screen, two nodes respectively associated with two of the plurality of software components; and
  outputting, to the display screen and responsive to a selection of the two nodes, a link connecting the two nodes, wherein
  a first of the two nodes is graphically linked to the software component to which the first node is associated,
  the first node displays a selected property of the software component to which the first node is associated,
  the plurality of software components are disposed in the first layer,
  the plurality of nodes are disposed in the second layer, and
  the protection layer prevents selection of the plurality of components in the first layer.

2. The system of claim 1, wherein
the first node is graphically linked to the software component with a three-dimensional shape, and
the three-dimensional shape includes
  the one node as one portion and
  the associated software component as a second portion.

3. The system of claim 2, wherein
the one node is an upper face of the three-dimensional shape,
the associated software component is a lower face of the three-dimensional shape.

4. The system of claim 3, wherein
the three-dimensional shape is a truncated pyramid.

5. The system of claim 1, wherein
the link is based upon the selected property.

6. The system of claim 1, wherein
a second of the two nodes is associated with a tab of one of a plurality of windows.

7. The system of claim 1, wherein the at least one hardware processor is further configured to initiate and/or perform:
  displaying a plurality of tabs respectively associated with a plurality of windows, and
  maintaining, upon a selection of a new tab, display of the two nodes and the link connecting the two nodes.

8. The system of claim 1, wherein the at least one hardware processor is further configured to initiate and/or perform:
  outputting, to the display screen, a shadow for each of the two nodes.

9. The system of claim 1, wherein
the protection layer is semi-transparent.

10. A computer program product, comprising:
a storage device having stored therein computer-readable program code, which when executed by a computer hardware device, causes the computer hardware device to perform:
  outputting, to a display screen, a plurality of concurrently-displayed software components;
  outputting, to the display screen, a protection layer between a first layer and a second layer;
  outputting, to the display screen, two nodes respectively associated with two of the plurality of software components; and
  outputting, to the display screen and responsive to a selection of the two nodes, a link connecting the two nodes, wherein
  a first of the two nodes is graphically linked to the software component to which the first node is associated,
  the first node displays a selected property of the software component to which the first node is associated,
  the plurality of software components are disposed in the first layer,
  the plurality of nodes are disposed in the second layer, and
  the protection layer prevents selection of the plurality of components in the first layer.

11. The computer program product of claim 10, wherein
the first node is graphically linked to the software component with a three-dimensional shape, and
the three-dimensional shape includes
  the one node as one portion and
  the associated software component as a second portion.

12. The computer program product of claim 11, wherein
the one node is an upper face of the three-dimensional shape,
the associated software component is a lower face of the three-dimensional shape.

13. The computer program product of claim 12, wherein the three-dimensional shape is a truncated pyramid.

14. The computer program product of claim 10, wherein the link is based upon the selected property.

15. The computer program product of claim 10, wherein a second of the two nodes is associated with a tab of one of a plurality of windows.

16. The computer program product of claim 10, wherein the computer-readable program code further causes the computer hardware device to perform:
    displaying a plurality of tabs respectively associated with a plurality of windows, and
    maintaining, upon a selection of a new tab, display of the two nodes and the link connecting the two nodes.

17. The computer program product of claim 10, wherein the computer-readable program code further causes the computer hardware device to perform:
    outputting, to the display screen, a shadow for each of the two nodes.

18. The computer program product of claim 10, wherein the protection layer is semi-transparent.

* * * * *